US008745887B2

(12) United States Patent
Dowidar

(10) Patent No.: US 8,745,887 B2
(45) Date of Patent: Jun. 10, 2014

(54) METHOD OF MEASURING A COMPONENT

(75) Inventor: Helmy A. M. Dowidar, Derby (GB)

(73) Assignee: Rolls-Royce PLC, London (GB)

( * ) Notice: Subject to any disclaimer, the term of this patent is extended or adjusted under 35 U.S.C. 154(b) by 215 days.

(21) Appl. No.: 13/409,613

(22) Filed: Mar. 1, 2012

(65) Prior Publication Data

US 2012/0233869 A1      Sep. 20, 2012

(30) Foreign Application Priority Data

Mar. 16, 2011   (GB) .................................. 1104410.4

(51) Int. Cl.
*G01B 5/20*  (2006.01)
*G01B 5/008* (2006.01)
*G01B 7/008* (2006.01)

(52) U.S. Cl.
USPC ............................................................ 33/554

(58) Field of Classification Search
USPC ........... 33/554, 545, 546, 549, 550, 551, 553, 33/555
See application file for complete search history.

(56) References Cited

U.S. PATENT DOCUMENTS

| | | | | |
|---|---|---|---|---|
| 4,122,607 A | * | 10/1978 | Hopf | 33/561 |
| 4,166,323 A | * | 9/1979 | Maag | 33/501.9 |
| 4,593,476 A | * | 6/1986 | Clark et al. | 33/529 |
| 4,679,331 A | * | 7/1987 | Koontz | 33/551 |
| 4,908,782 A | | 3/1990 | Pekarek et al. | |
| 5,208,763 A | | 5/1993 | Hong et al. | |
| 5,276,974 A | | 1/1994 | Chanoni et al. | |
| 5,521,847 A | | 5/1996 | Ostrowski et al. | |
| 6,145,212 A | * | 11/2000 | Geise et al. | 33/549 |
| 6,470,587 B1 | * | 10/2002 | Cunningham et al. | 33/557 |
| 7,194,378 B2 | | 3/2007 | Gorsch et al. | |
| 7,636,646 B2 | * | 12/2009 | Kojima | 702/168 |
| 7,676,944 B2 | * | 3/2010 | Kato | 33/551 |
| 8,567,084 B2 | * | 10/2013 | Ogihara et al. | 33/553 |
| 2002/0077769 A1 | | 6/2002 | Ebinger | |
| 2005/0165578 A1 | | 7/2005 | Gorsch et al. | |
| 2007/0144024 A1 | * | 6/2007 | Sato et al. | 33/554 |
| 2010/0278418 A1 | * | 11/2010 | Chang et al. | 382/152 |

FOREIGN PATENT DOCUMENTS

| | | |
|---|---|---|
| EP | 1 681 532 A2 | 7/2006 |
| WO | WO 00/06969 A1 | 2/2000 |
| WO | WO 2010/037904 A1 | 4/2010 |
| WO | WO 2010/099890 A1 | 9/2010 |

OTHER PUBLICATIONS

Search Report issued in European Patent Application No. EP 12 15 7630 dated Jun. 19, 2012.
Apr. 21, 2011 Search Report issued in British Patent Application No. 1104410.4.

* cited by examiner

*Primary Examiner* — Christopher Fulton
(74) *Attorney, Agent, or Firm* — Oliff PLC

(57) ABSTRACT

This invention relates to a method of measuring a collapsed component, comprising: laying the component to be measured on a bed; detecting the location of a plurality of points on the component; storing the location of each of the points relative to at least one other point; mapping the plurality of points on to a reference shape which corresponds to the component in a non-collapsed state to provide mapped data points; and, using the mapped data points to determine the dimensions of the component.

15 Claims, 3 Drawing Sheets

METHOD OF MEASURING A COMPONENT

This invention relates to a method of measuring a component. In particular, this invention relates to a method of measuring collapsed circular components in a free state.

Gas turbine engines which use shrouds on the end of rotating components, particularly turbine blades, to aid sealing and reduce over tip gas flow are well known. Such shrouds are typically made as annular components which are cut into segments as required.

Once an annular component has been cut it is necessary to measure the resulting component to ensure it has the required dimensions. However, this is not a straightforward matter as the shroud segments can often collapse from the original intended arcuate shape due to internal stresses created during manufacture. The skilled person will appreciate that the amount of collapse is often relatively small compared to the overall dimensions, but is significant given the required tolerances for gas turbine engines nonetheless.

The present invention seeks to provide an improved method of accurately measuring the dimensions of a collapsed component.

In a first aspect the present invention provides a method of measuring an arcuate component which has collapsed to a non-round state during a manufacturing process, comprising: laying the component to be measured on a bed; detecting the location of a plurality of points on the component; storing the location of each of the points relative to at least one other point; mapping the plurality of points on to an annular reference shape which corresponds to the component in a non-collapsed state to provide mapped data points; and, using the mapped data points to determine the dimensions of the component.

Obtaining the locations of a plurality of points and mapping them on to a reference shape allows the accurate measurement of the component to carried out whilst in a free state. This avoids the need to arrange a collapsed component in a non-collapsed configuration for measurement which is time consuming and difficult to achieve.

The location of each point can be relative to an adjacent point. The location of the points may be along a common axis. The axis may be parallel to a longitudinal axis of the component. The axis may be defined by an intersection between two faces. The points may be evenly distributed along the length of the component.

Detecting the location of the plurality of points can comprise: using a sensor to detect the presence of a component feature at a reference location; and, adjusting the position of the sensor so as to locate the component feature if the component feature is not detected at the reference location. The adjustment of the sensor position may include sweeping the sensor in a predetermined x-y path. The predetermined path may include a raster scan. The adjustment of the position may be determined by the relative position of at least one other point and the reference location.

The sensor may be one of the group including a pressure, optical, deflection, sonic or Doppler. Preferably, the sensor includes a deflectable stylus.

The component feature may be one of the group comprising: a side surface, an edge, an upper surface, a protrusion and a depression. The sensor can be configured to detect an edge in the form of an intersection between two faces.

The reference location can be determined using the reference shape. The reference location may be determined using the reference shape and the relative location of an adjacent point.

The location of each point can be stored as a distance from an adjacent point. The reference location may be the adjacent point.

The location of each point can be stored as an x-y coordinate.

The method of the invention may further comprise selecting and storing a reference point to provide a first point. Preferably, the reference point is located at a first end of the component.

The component may be a segment of an annulus. The component may be a gas turbine shroud or may include a plurality of gas turbine shrouds. Where the reference shape is arcuate, the radius of the reference shape may be of any value. However, the invention finds particular application in a reference shape having a radius of between 200 mm and 450 mm.

The arcuate component may have two end faces. The method may further comprise: determining the relative parallelism of the two end faces from a plurality of the points; and, determining a change in circumferential length of the arcuate component from the relative parallelism of the two end faces. Using the mapped data points to determine the dimensions of the component may include determining the arcuate length of the component from the mapped data points and correcting the determined arcuate length by the determined change in circumferential length.

Mapping may comprise: selecting a first point; identifying the intersection of the reference shape and the stored distance of a second point measured from the first point; and, storing the location of the intersection as the location of the second corrected point.

The location of the points can be measured with a coordinate measuring machine.

The method may further comprise the measurement of between 25 and 35 data points.

Laying the component on the bed may comprise placing the component in contact with a fixture attached to the bed. The fixture may be L-shaped. The fixture may include one or more marks or formations. The one or more marks or formations may provide a reference point which the component can be placed relative to. The reference point may determine the first point on the component.

The bed may be a flat bed. Laying the component on the bed may include placing the component within a retention device. The retention device may be a vice. The bed may form part of a vice.

In another aspect, the present invention provides a data carrier having computer executable instructions stored thereon for carrying out the steps of the first aspect of the invention.

An embodiment of the invention is described below with the aid of the following drawings in which.

The component of the embodiment described below is a circular member in the form of a shroud for a gas turbine engine. Typically, shrouds are made from an annulus of metal which is cut into segments.

It is common for the segments of shroud to collapse by an unpredictable amount when cut such that the radius and shape are no longer as specified. Prior to the invention, it has been necessary to fix the shroud into a device which constrains it to its pre-cut shape using a series of rollers attached to a vertical flat bed so that it can be accurately measured and the dimensions of the shroud verified with clocks and height gauges. This method is time consuming and requires a large degree of skill in a human operator. There are also questions over the accuracy of the method due to the unavoidable human error introduced by the operator.

Figure 1:
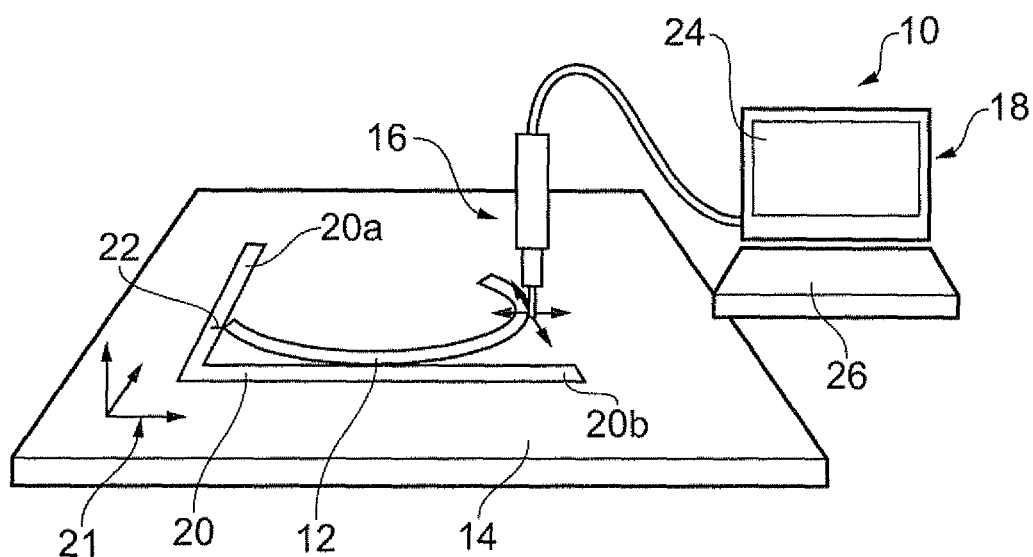
FIG. 1 shows an apparatus for measuring the component in a free state.

In FIG. 1 there is shown a measuring apparatus 10 which can be used for measuring a component 12 held in a free state. The measuring apparatus 10 can generally be described as a coordinate measurement machine which principally includes a flat bed 14 and a sensor in the form of a measurement probe 16. The measurement probe 16 of this embodiment is a touch trigger probe. The measurement probe 16 is coupled to a processing apparatus in the form of a computer 18. The flat bed 14 also includes an L-shaped fixture 20 having two arms 20a, 20b against which the component 12 can be held. The fixture 20 is aligned to predetermined x-y coordinates 21 and provides a reference frame in which the component 12 is positioned during a measurement procedure. The fixture 20 includes a reference point on one of the arms 20a in the form of a mark 22. The component 12 can be located against the reference point prior to measuring the component 12 so as to provide a first reference point.

The computer 18 includes a processor, memory, a graphical user interface 24 for displaying the results of a measurement and an input device 26 for an operator to enter information into the system. The skilled person will appreciate that the computer 18 may include any other known features which may be required or advantageous for carrying out the invention. For example, the computer may include a communication port for connecting to a network so that any data may be electronically exported.

The measurement probe 16 is arranged to measure points on the component 12 and includes a stylus, the deflection of which provides a signal to the computer 18 when it touches the side of the component 12. When the computer 18 receives the signal it stores the current location of the probe 16 as the location of that particular point within the x-y coordinate reference frame. The skilled person will appreciate that a number of different sensors can be used to carry out the invention.

The measurement probe 16 includes an actuation system (not shown) which is controlled via the computer 18 such that the stylus can be moved to a plurality of points around the circumference of the component 12 in an automated fashion. It is to be appreciated that the actuation system may be a known system and may, for example, include a servo motor to provide controlled and registered movement. In the present embodiment, the measurement probe is arranged so as to move in the x-y plane 21 as identified in FIG. 1.

The component 12 of the described embodiment is a portion of an annular member which has been cut to provide an arcuate segment. The segment in the present embodiment is around 180 degrees and has a radius of approximately 350 mm, but the skilled person should appreciate that the invention can be applied to a range of arc lengths.

In use, an operator places the component 12 onto the flat bed 14 such that two edges of the component 12 contact the inner surface of each arm 20a, 20b, of the L-shaped fixture 20. One end of the component 12 is placed approximately adjacent to the mark 22 on the arm 20a of the fixture 20. The location of the mark 22 is stored in the computer 18 such that the probe 16 can be manoeuvred to its location. Once at the mark 22, the probe is moved back and forth over the flat bed 14 in a raster scan until the stylus contacts component 12. This contact point provides the first point and its location is stored.

Once the first point is established the measurement probe 16 is moved via the actuation system to an approximate location of a second data point. The approximate location of the second data point is determined on the basis of the diameter of the annulus from which the segment has been cut and the number of points which are required for a given component. That is, the point local to where the component 12 would be if it had not collapsed.

Once in the approximate position, the probe 16 is moved in a predetermined raster pattern along the x-y coordinates until it contacts and senses the edge of the component 12. The coordinates of this point are then stored before the measurement probe 16 is moved to the next approximate data point location and the process repeated. In this way, the computer 18 uses the previous data point and the reference shape to determine the location of each data point until all of the data points have been stored.

In the present embodiment the method includes acquiring 30 points along the length of the component 12. The more points measured on the circumference, the more the results are accurate. However, 30 points have been found to provide a good compromise between accuracy and the required time for the measurement to be carried out.

Figure 2:
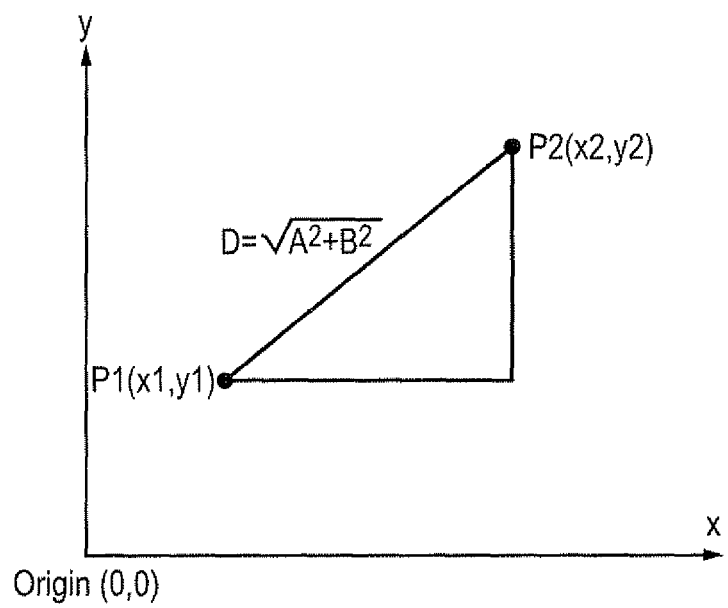
FIG. 2 shows a graphical representation of two measured points in a reference frame.

The measured points are stored as x-y coordinates. These coordinates are processed by the computer 18 to provide a distance between adjacent points. The distances are then stored. FIG. 2 shows two data points as measured by the measurement probe 16 in the x-y coordinate frame, where P1 is a first point having coordinates x1, y1 and P2 is a second point having coordinates x2, y2. The relationship of the x-y coordinates and the distance, D, between the points is given by:

$$D=\sqrt{(y2-y1)^2+(x2-x1)^2}$$

Once the distances have been calculated and stored, the stored data points can be mapped on to a reference shape, which in the described embodiment, is a circle corresponding to the dimensions of the annulus from which the component was cut. That is, the circle has a radius that the component should have if not collapsed.

Figure 3:
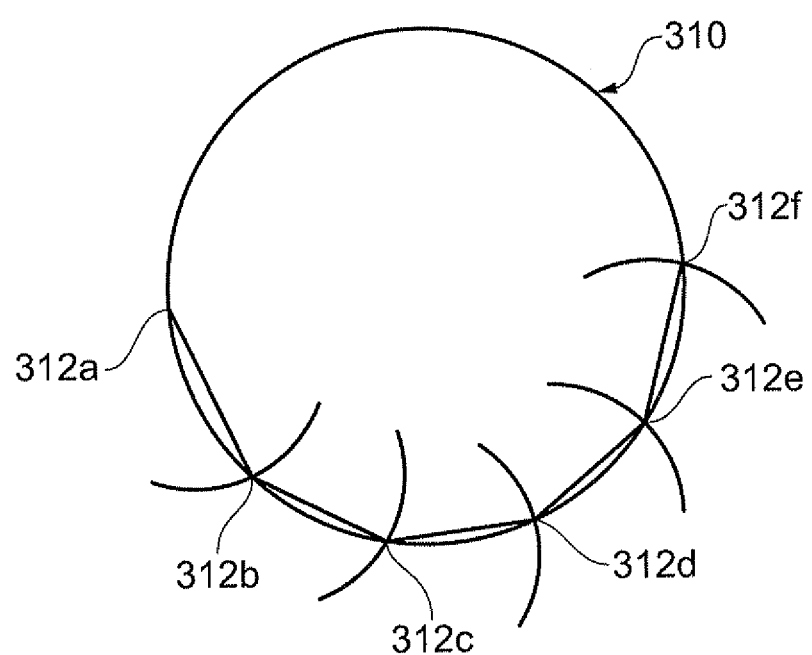
FIG. 3 shows a graphical representation the points shown in FIG. 2 overlaid on a circle having predetermined dimensions.

FIG. 3 shows the reference shape in the form of a circle 310 onto which six data points, 312a ... 312f, are mapped to illustrate the mapping technique of the embodiment. The mapping of each data point is achieved by plotting the location of the stored distances on to the reference circle 310 relative to the preceding adjacent data point. Hence, the first data point 312a is mapped onto the reference circle 310 and the second data point 312b is then mapped onto the circle at the stored distance from the first from the data point 312a. In the described embodiment, the position of the adjacent data points are found by locating the intersection of reference circle 310 and an arc centred on the preceding adjacent data point having a radius which is equal to the stored distance. The location of the third data point 312c is mapped in a similar way but using the second data point 312b as a reference point and thus the centre of the radial arc plotted by the distance.

Once the data points 312a ... 312f have all been mapped on to the nominal circle 310 the mapped data can be used to determine the dimensions of the component. For example, the overall arcuate length of the component can be taken from the mapped data points by assessing where the final data point 312f lies on the nominal circle relative to the first data point 312a. Thus, subject to the correction described below, the length of the collapsed component can be accurately measured irrespective of any collapse.

Figure 4A:
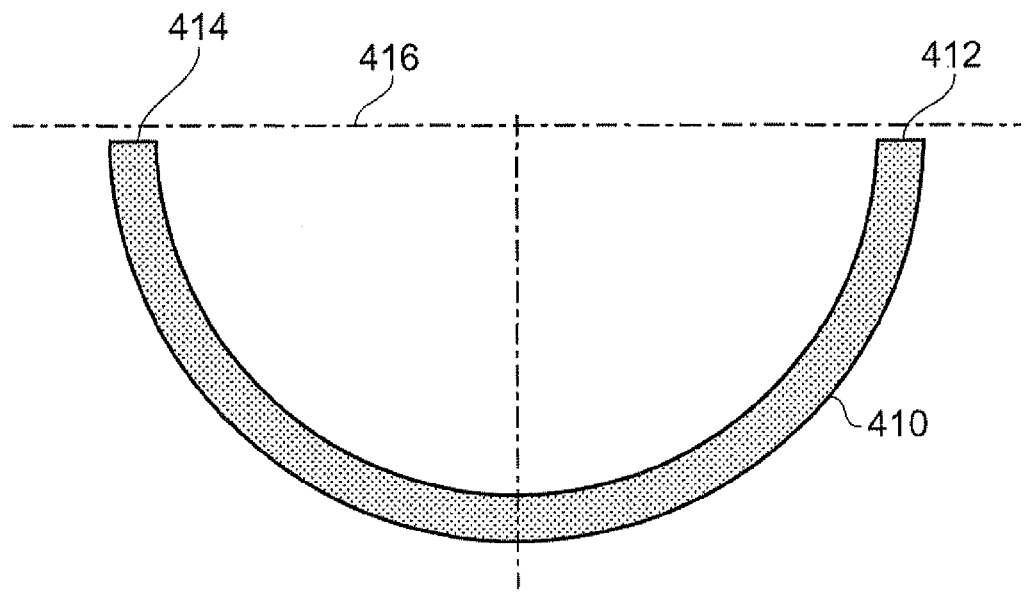
FIGS. 4a and 4b show a collapsed component having non-parallel ends.
Figure 4B:
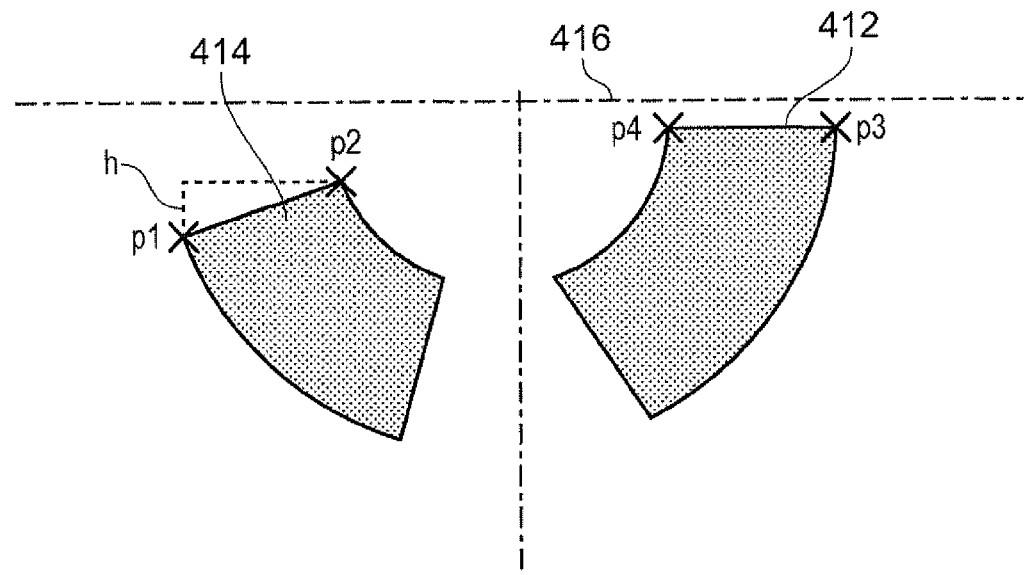

Correction may be needed to the above described measurement method to account for internal stresses which result in an artificial or temporary change in the measured length of the collapsed component. That is, when a ring is cut to provide a shroud 410, the end faces 412, 414 of the shroud 410 are cut so as to be parallel to each other and a centreline 416 as shown in FIG. 4a. If the shroud 410 does not expand or contract when cut then the two end faces 412, 414 will remain parallel. However, internal stresses within the shroud 410 can change the annular shape of the shroud and the circumferential length which results in the end faces 412, 414 not being parallel as shown in FIG. 4b.

To quantify the physical change of the shroud 410 circumference length, two points are measured at the edges of the collapsed end (p1 and p2 in FIG. 4b) after aligning one end 412 to the nominal centre line 416 of the shroud 410. Thus, the total drop h between the two points is calculated as h=p2−p1. It will be appreciated that aligning the end 412 to the centreline may be done by locating points p3 and p4 and assessing the relative position of p1 and p2 accordingly.

When the collapsed end 414 is forced back to its nominal position which is parallel to the centre line, p1 and p2 will have to move by half of the total drop h. This means point p1 will move up by h/2 and point p2 will move down by h/2. The correction factor, h/2, can then be added or subtracted to the mapped length of the shroud 410 to account for the circumferential expansion or contraction thereby giving a more accurate estimation of the actual length that the shroud will be once clamped into an engine in an arcuate position.

In another embodiment, the measurement probe 16 is used to measure the upper surface of the component 12 (as shown in FIG. 1) at a plurality of points such that the out of plane or z-direction deformation of the component 12 can be measured. This can be achieved in a similar manner to that described above for the x-y deformation.

The invention claimed is:

1. A method of measuring an arcuate component which has collapsed to a non-round state during a manufacturing process, comprising:
    laying the component to be measured on a bed;
    detecting the location of a plurality of points on the component;
    storing the location of each of the points relative to at least one other point;
    mapping the plurality of points on to a reference shape which corresponds to the component in a non-collapsed state to provide mapped data points; and,
    using the mapped data points to determine the dimensions of the component.

2. The method as claimed in claim 1, wherein the location of each point is measured relative to an adjacent point.

3. The method as claimed in claim 2 wherein the location of each point is stored as a distance from an adjacent point.

4. The method as claimed in claim 3 wherein the location of each point is stored using an x-y coordinate.

5. The method as claimed in claim 3 wherein the mapping comprises:
    selecting a first point to provide a reference point;
    identifying the intersection of the reference shape and the stored distance of a second point measured from the reference point; and,
    storing the location of the intersection as the location of the second point.

6. The method as claimed in claim 5, wherein the reference point is the second point from a previous mapping step.

7. The method as claimed in claim 1, wherein detecting the points comprises:
    using a sensor to detect the presence of the component at a reference location;
    adjusting the position of the sensor so as to search for the component when the component is not detected with the sensor at the reference location.

8. The method as claimed in claim 7 calculating the approximate position of the reference location using the reference shape and the location of an adjacent point.

9. The method as claimed in claim 1 further comprising selecting and storing a reference point to provide a first data point.

10. The method as claimed in claim 9 wherein the reference point is located at a first end point of the component.

11. The method as claimed in claim 1 wherein the arcuate component has two end faces, further comprising:
    determining the relative parallelism of the two end faces from a plurality of the stored points; and,
    determining a change in circumferential length of the arcuate component from the relative parallelism of the two end faces,
    wherein using the mapped data points to determine the dimensions of the component includes determining the arcuate length of the component from the mapped data points and correcting the arcuate length by the determined change in circumferential length.

12. The method as claimed in claim 1 wherein the location of the points is detected and stored using a coordinate measuring machine.

13. The method as claimed in claim 1 further comprising the measurement of between 25 and 35 points.

14. The method as claimed in claim 1 wherein laying the component on the bed comprises placing the component in contact with an L-shaped fixture attached to the flat bed.

15. A data carrier having non-transitory machine readable code stored thereon, the code providing instructions for carrying out the method as claimed in claim 1.

* * * * *